July 23, 1968  W. A. KORTAN  3,393,547
METAL FORMING METHOD AND APPARATUS
Filed July 22, 1966  3 Sheets-Sheet 1
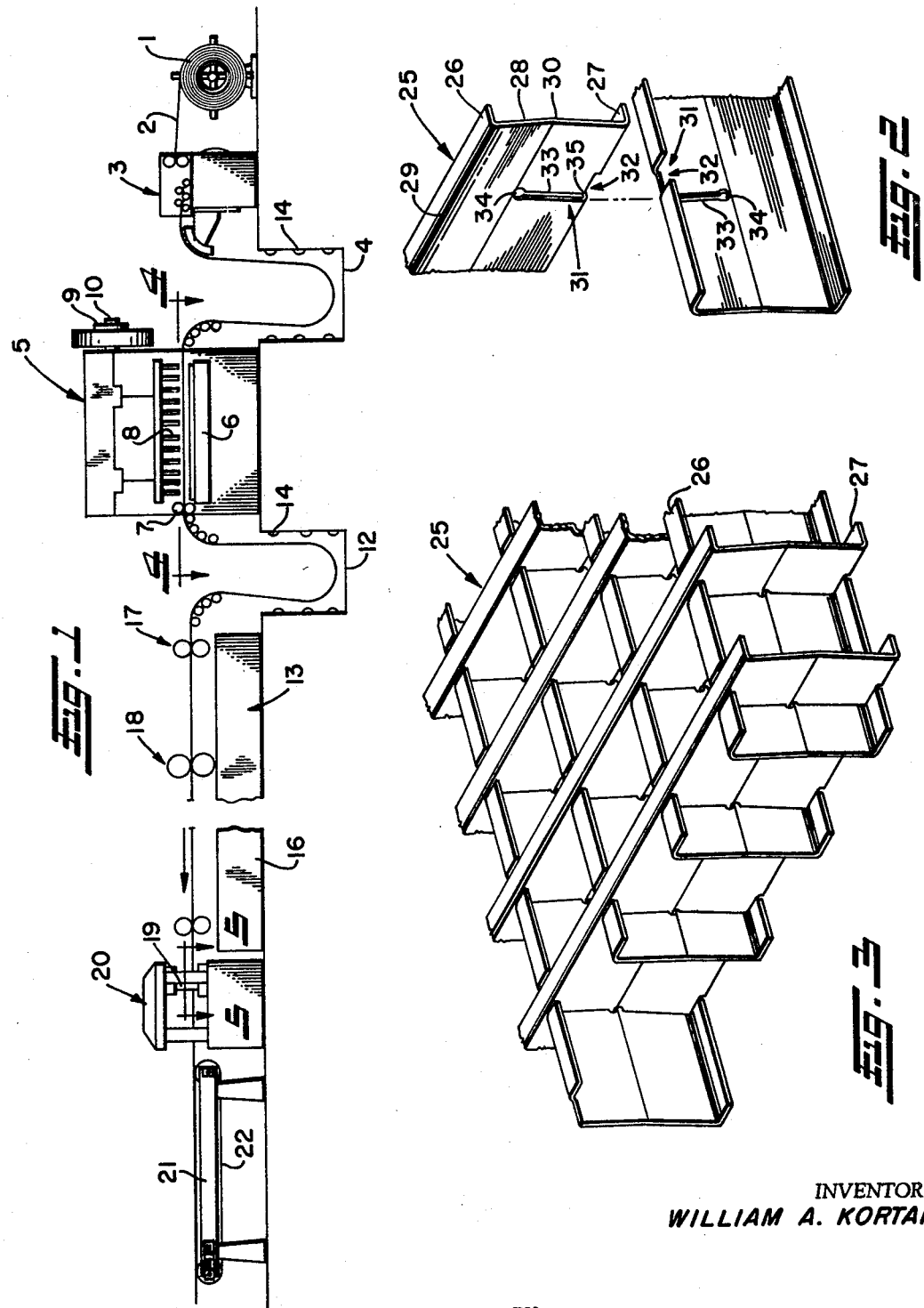
INVENTOR
WILLIAM A. KORTAN
BY *Oberlin, Maky & Donnelly*
ATTORNEYS July 23, 1968 W. A. KORTAN 3,393,547
METAL FORMING METHOD AND APPARATUS
Filed July 22, 1966 3 Sheets-Sheet 2
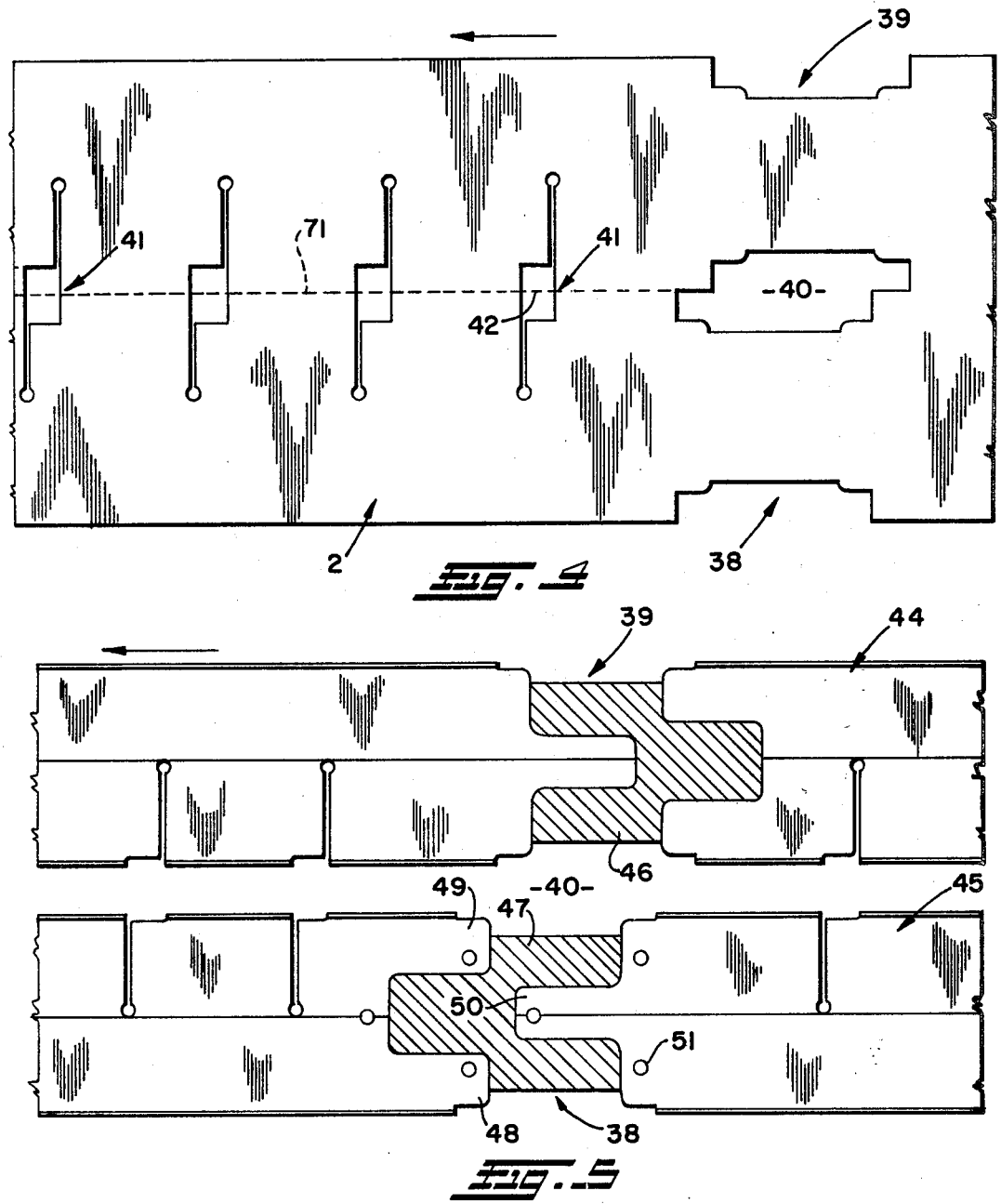
INVENTOR
WILLIAM A. KORTAN
BY *Oberlin, Maky & Donnelly*
ATTORNEYS July 23, 1968 W. A. KORTAN 3,393,547
METAL FORMING METHOD AND APPARATUS
Filed July 22, 1966 3 Sheets-Sheet 3

INVENTOR
WILLIAM A. KORTAN
BY Oberlin, Maky & Donnelly
ATTORNEYS

United States Patent Office 3,393,547
Patented July 23, 1968

3,393,547
METAL FORMING METHOD AND APPARATUS
William A. Kortan, North Olmsted, Ohio, assignor to The Yoder Company, Cleveland, Ohio, a corporation of Ohio
Filed July 22, 1966, Ser. No. 567,120
12 Claims. (Cl. 72—131)

This invention relates generally as indicated to metal forming method and apparatus and more particularly to a process and apparatus for the production of elongated channel shape members having notches in one edge.

It is extremely difficult to roll form a strip of material having a severe notch in one edge. To do so usually requires the opposite edge to be formed or turned up first properly to grip the work. However, this cannot be done with any degree of accuracy in that the roll forming of strip usually requires the working of both edges simultaneously. This difficulty in the roll forming of notched materials is even accentuated when the end product has a tolerance on the order of plus or minus .010 inch.

Channel shape members having interfitting notches on one edge thereof for use in the production of landing mats, truck and railroad car flooring, and the like, are presently made by the use of large press brakes and such process has many apparent disadvantages. For example, the length of the elongated element produced is, of course, limited by the size of the press brake and it may require several strokes of the press to complete the element. It can readily be seen that a continuous roll forming of the element maintaining the required tolerances will produce such an element much more economically.

Applicant has discovered that such edge notched elongated members can successfully be roll formed to the desired tolerance by prenotching a strip of metal and after the strip is at least partially formed, slitting such strip through the notches.

It is accordingly a principal object of the present invention to provide a process for the formation of elongated formed elements having severe notches in one edge.

Another principal object is the provision of apparatus capable of roll forming elongated members having substantial notches in one edge thereof.

Another object is the provision of a process and apparatus for the highly economical production of thin steel structural members having formed edges, at least one of which is substantially notched.

Still another object is the provision of a process and apparatus for the production of such steel structural members having a tolerance of plus or minus .010 inch.

A further object is the provision of a process and apparatus for the production of such members wherein the production rate is a whole even number multiple of the mill speed.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In said annexed drawings:

FIG. 1 is a somewhat schematic side elevation of apparatus in accordance with the present invention;

FIG. 2 is an enlarged view of the end product illustrating how the product may be interfitted with its duplicate to form a structural panel or the like;

FIG. 3 is a view similar to FIG. 2 illustrating a series of such members interconnected to form a structural latticework which may be the core of paneling;

FIG. 4 is a top plan view of the strip on an enlarged scale taken substantially on the line 4—4 of FIG. 1 illustrating the prenotch pattern placed therein;

FIG. 5 is a view similar to FIG. 4 taken substantially on the line 5—5 FIG. 1 illustrating the portions of the formed elements which are removed by the cut-off.

Figure 6:
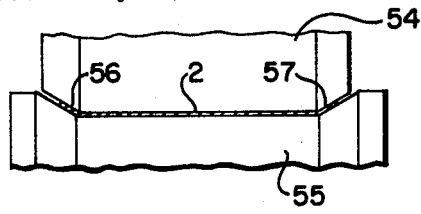
FIGS. 6–15 are fragmentary vertical sections taken through certain successive roll stands in the roll forming machine illustrating the manner in which the strip is formed.
Figure 7:
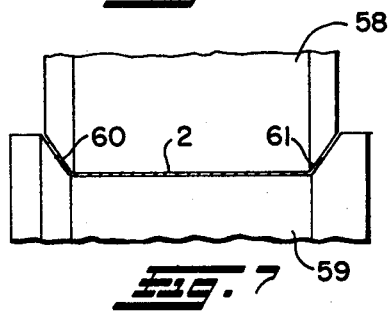
Figure 8:
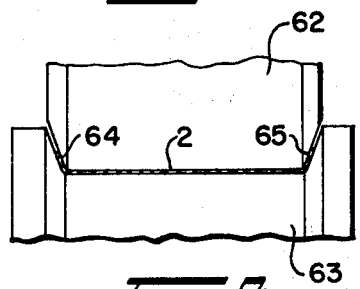

Referring now to the annexed drawings and more particularly to FIG. 1 it will be seen that the apparatus for producing the elongated elements may comprise an uncoiler or coil reel 1 having a strip of metal 2 wound thereon which passes through flattener 3 and into loop pit 4 ahead of prenotching press 5. The strip 2 passes from the loop 4 over the bed 6 of the press and is driven a predetermined distance intermittently by press feed 7. When in proper position, the prenotch dies 8 descend placing the cut-out pattern more clearly seen in FIG. 4 in the strip 2. The punch or male dies may be driven by air clutch 9 on drive shaft 10 in conventional manner. As indicated, the press 5 may be of substantial length in order to prenotch a substantial length of the strip 2 at one stroke, or greater lengths exceeding the press length by multiple strokes.

From the press 5, the now prenotched strip 2 enters a loop pit 12 preceding the forming mill 13. It is noted that each of the loop pits 4 and 12 may be provided with light source and light receivers on opposite sides of the pit as indicated at 14 with the loop itself blocking the light path to provide an indication of the extent of the loop within the pit. In this manner the continuous operation of the roll forming mill 13 can be made compatible with the intermittent operation of the prenotch press 5.

The roll forming mill 13 includes a base 16 having a plurality of roll stands 17 mounted thereon, each of which includes top and bottom roll shafts having the roll tooling mounted thereon. Such shafts are power driven in synchronism from one side of the mill in conventional manner. In the illustrated embodiment, there may be 12 such roll stands in the forming mill. One of such stands, indicated at 18, is a slitter which is operative to split the strip 2 into two slide-by-side elements for individual completion of the forming operation thereon.

After the now separated strip elements have been formed, they pass through side-by-side cut-offs 19 of punch type cut-off 20. From the cut-off 20 the elements then pass onto a runout table 21 which may include a conveyor 22 which may be driven at a speed greater than that of the mill 13. From the conveyor 22 the elements may then be stacked and packaged for shipment.

Before examining the process and apparatus for producing the product, it would be well to examine the product itself which may be exemplified by the illustrations of FIGS. 2 and 3. It will, however, be appreciated that the product per se forms no part of the present invention. Referring first to FIG. 2 it will be seen that the exemplary product may comprise an element 25 which is an elongated strip or member of high strength thin gauge steel such as high strength COR-TEN* or equivalent having a thickness of .018 plus .002 minus .000 with a minimum yield point of 85,000 p.s.i. and a 10% elongation. The finished product is provided with edge flanges 26 and 27 which join the web or back 28 with a slight radius 29. The web 28 may be provided with a slight crown indicated at 30 on the order of .025 inch.

One edge of the element is provided with a severe notch shown generally at 31. The notch 31 has a configuration \* Trademark U.S. Steel Corporation.

providing an enlarged entrant portion 32 which in the illustrated embodiment may be approximately .225 inch deep and %32 inch wide and from one edge of such enlarged entrant portion there extends a relatively narrow transverse slot 33 which may be from about .029 to about .034 inch wide and which terminates in a bulb portion 34 having a %32 diameter. A radius of from about .048 to about .079 is provided as indicated at 35 at the juncture between the slot 33 and the enlarged entrant portion 32. These notches may be spaced along the one edge of the element in the illustrated embodiment on centers of approximately 1.3125 inches.

As seen both in FIGS. 2 and 3, the elements 25 may be interfitted by means of the edge notches with the enlarged entrant portions 32 of the notches accommodating the opposite flanges 26 of the mating element so that a flush flange latticework construction may be provided as indicated in FIG. 3. Such reticulate structure may then form the core of paneling and stainless steel skins may be positioned on the top and bottom and secured to the core structure by, for example, epoxy cements. Epoxy cements may also be used to bond the elements together when interfitted by the mating slot connection. Such latticework finds use as cores for landing mats in 4′ square pads and the skins may be approximately of the same thickness as the elements.

As seen more clearly in FIGS. 4 and 5, the prenotch press will place in the strip 2 the cut-out pattern seen in FIG. 4 and the cut-off press 20 will then remove the shaded portion in FIG. 5 from the formed product. The prenotch press places notches 38 and 39 in the side edges of the strip 2 as well as central cut-out aperture 40. In addition, the prenotch press 5 places apertures 41 centrally of the strip 2 on the same centers as the notches 31 of the finished product. The apertures 41 comprise plane figures having two-fold symmetry with respect to the center or point 42, and, of course, such apertures as well as their centers 42 are longitudinally aligned centrally of the strip 2. The apertures 41 are thus two-fold symmetrical doublings of the configuration of the notches 31 to be placed in the finished elements with the notch configuration being obtained simply by dividing the apertures 41 longitudinally centrally.

As the strip 2 prenotched as seen in FIG. 4 moves through the forming mill 13, it will be longitudinally split by the slitter 18 into two separate laterally spaced elements shown at 44 and 45 in FIG. 5. After the forming mill has completed the formation of the flanges and the crown in the back of the elements, the cut-off press will then remove the portions indicated at 46 and 47 by shade lines. In this manner the finished product may be provided at its opposite ends with tabs which may be bent to provide right angle connections. One end will have laterally spaced tabs 48 and 49 as indicated in FIG. 5 while the opposite end will have a central tab 50 capable of fitting between the tabs 48 and 49 on the opposite end. Apertures 51 may be positioned adjacent the ends of the elements to facilitate the fastening of the same together.

Referring now more particularly to FIGS. 6–15, it will be seen that the strip 2 enters the initial roll stand between rolls 54 and 55 and in this pass, the outer edges of the strip are bent upwardly to approximately 30° of inclination about a .159 radius as indicated at 56 and 57. Rolls 58 and 59 of the second pass seen in FIG. 7 may then bend the outer edges of the strip 2 to an inclination of approximately 55° as indicated at 60 and 61 with the radius being diminished. In the third pass seen in FIG. 8, rolls 62 and 63 may then bend the outer edges to an inclination of approximately 70° with the radius being still further diminished as indicated at 64 and 65.

Figure 9:
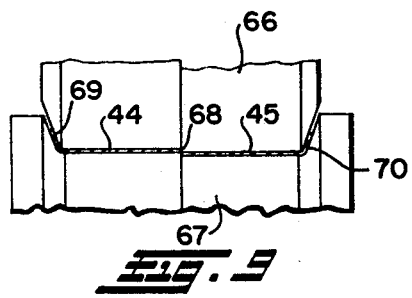

The outer edges of the strip 2 now having been partially formed, the strip 2 passes through the tooling of the fourth pass indicated at 66 and 67 in FIG. 9 and is longitudinally slit as indicated at 68 while the edges are firmly gripped as seen at 69 and 70. That portion of the tooling 66 and 67 securing the edges may be the same as of the third pass seen in FIG. 8. The strip 2 is thus slit along the line indicated at 71 in FIG. 4 through the aligned centers 42 of the apertures 41.

Figure 10:
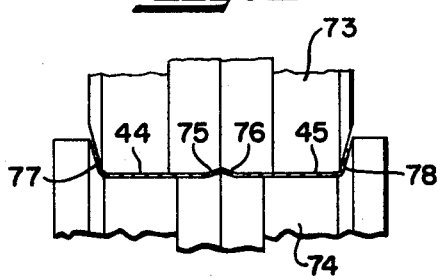
Figure 11:
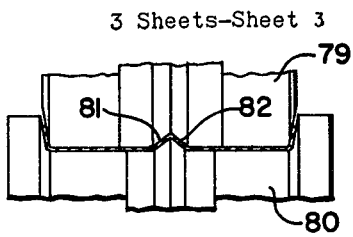
Figure 12:
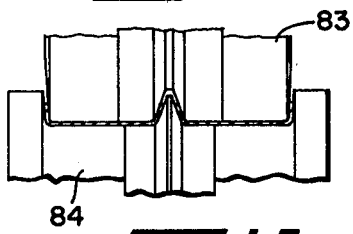
Figure 13:
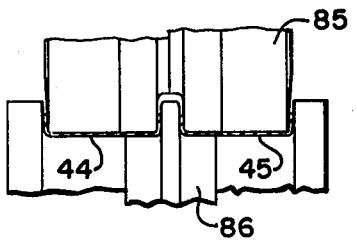
Figure 14:
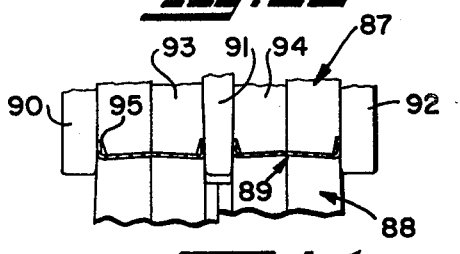

In the next pass seen in FIG. 10, the now individual elements 44 and 45 pass through rolls 73 and 74 bending the split or inner edges to an inclination on the order of 20° about a substantial radius as, for example, .243 inch as shown at 75 and 76. Simultaneously, the outer edges may be bent further and the radius diminished as indicated at 77 and 78. At the next pass seen in FIG. 11, rolls 79 and 80 may bend the inner edges to an inclination of approximately 40° as indicated at 81 and 82 while the outer edges are bent slightly further with the radius of the bend further diminished. At the next pass, not shown, the inner edges may be bent to an inclination of approximately 55° while the outer edges are bent to an inclination of approximately 85°. At the eighth pass shown in FIG. 12, the inner edges may be bent by the rolls 83 and 84 while the outer edges may be bent to approximately 88°, with the radius of such bends, of course, being still further diminished. At the ninth pass, not shown, the inner edges may be bent to approximately an inclination of 78° while the outer edges may be maintained at their 88° inclination. At the tenth pass, shown in FIG. 13, the individual elements 44 and 45 pass through rolls 85 and 86 with the outer edges being held at the same inclination while the inner edges are bent to an inclination of approximately 85°. In FIG. 14, at the eleventh pass, the roll tooling shown generally at 87 and 88 places a 3° crown in the center of each element as indicated at 89 and such crown has a depth of approximately .038 inch. Simultaneously, the edges of the members are bent backwardly to an inclination of approximately 88° by the roll tooling shown at 90, 91 and 92. At this pass, the top rolls 93 and 94 are provided with side shoulders shown at 95 which engage and precisely form the edge flanges.

Figure 15:
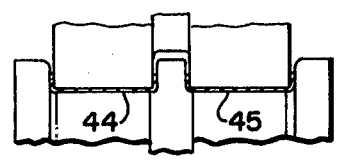

In the final or twelfth pass shown in FIG. 15, the crown in the center of each element is reduced to approximately .025 inch or a 2° crown and the edges or flanges formed in the members are straightened to the 90° requirement.

The individual elements then move through the cut-off press 20 and onto the runout conveyor 21.

It can now be seen that the inner severely notched edges are formed while the outer edges are securely gripped by the forming rolls and such inner edges are formed while the outer edges are completed.

It is apparent that the production rate is twice the mill speed and moreover, it will be appreciated that an initial strip which is a width of an even number multiple of the finished product may be employed so that two, four, six, eight, etc. elements may be produced simultaneously.

It can now be seen that there is provided method and apparatus for economically producing elongated channel shape elements having substantial notches in one edge, such elements being produced by placing apertures in a strip of a width an even number multiple of the width of the element to be formed, such apertures being plane figures having two-fold symmetry which when split longitudinally through the point of symmetry form the configuration of the notch in the finished element.

Other modes of applying the principles of the invention may be employed, change being made as regards the details described, provided the features stated in any of the following claims or the equivalent of such be employed.

I, therefore, particularly point out and distinctly claim as my invention:

1. A method of forming an elongated element having substantial notches in one edge comprising the steps of placing apertures in a strip, such apertures having two-fold symmetry and being the configuration of such notches when divided longitudinally through the point of symmetry, roll forming such strip, and longitudinally slitting such strip through the points of symmetry of such apertures to form said element.

2. The method of claim 1 wherein such strip is of a width which is an even number multiple of the width of the element formed.

3. The method of claim 1 including partially roll forming the outer edges of such strip, and then roll forming the inner notched edges of the elements resulting from the slitting of such strip while completing the roll forming of the outer edges.

4. The method of claim 1 wherein such apertures have a rectangular center portion and slots extending from the opposite outer edges terminating in bulb portions.

5. The method of claim 1 wherein such members are channel shape and the notches therein permit like members to be interconnected to form paneling cores.

6. The method of forming an elongated channel shape member having substantial notches in one edge comprising the steps of placing such notches longitudinally aligned and spaced from the edges of a strip which is an even number multiple of the width of the member to be formed, at least partially roll forming the outside edges of such strip, longitudinally slitting such strip at least along such notches, and then roll forming the slit edges while completing the roll forming of the outside edges.

7. The method of claim 6 wherein the notches placed in such strip are apertures having two-fold symmetry and are of the configuration of notches in the edge of the channel shape member when divided longitudinally through the point of symmetry.

8. The method of claim 6 wherein such strip is twice the width of the member to be formed and the notches placed in such strip are centrally located.

9. The method of claim 6 wherein the partial forming of the outside edges, the slitting of the strip, and the completion forming of the slit edges and outside edges is successively accomplished on a roll forming mill.

10. Apparatus for producing elongated channel shape members having severe notches in one edge comprising prenotch press means operative to place longitudinally apertures in a strip of material fed therethrough, such strip of material being an even number multiple of the width of the member to be formed, a roll forming mill operative to receive such prenotched strip of material, means in said mill operative at least partially to form the outer edges of such strip, to slit such strip longitudinally through the apertures formed by said prenotch press means, and then to roll form the slit edges thus produced, and cut-off means operative to sever the thus formed side-by-side members.

11. Apparatus as set forth in claim 10 wherein said prenotch press means places apertures in such strip having two-fold symmetry, such strip being slit through the center of symmetry of such apertures.

12. Apparatus as set forth in claim 10 wherein the outer edges of such strip are only partially formed prior to slitting of such strip, and thereafter completely formed while the slit edges are formed.

References Cited

UNITED STATES PATENTS

| | | | |
|---|---|---|---|
| 1,606,473 | 11/1926 | Killion | 72—129 |
| 1,673,787 | 6/1928 | Frahm et al. | 72—181 X |
| 1,773,459 | 8/1930 | Kellogg | 72—181 X |
| 2,183,018 | 12/1939 | Henderson | 72—132 X |
| 2,184,150 | 12/1939 | Parker et al. | 72—203 X |
| 2,493,415 | 1/1950 | Navin | 72—129 |
| 3,270,541 | 9/1966 | Tishkin | 72—129 X |
| 3,322,011 | 5/1967 | Kocian | 72—203 X |

MILTON S. MEHR, *Primary Examiner.*